Nov. 14, 1961 P. R. MOSSAY 3,009,072
FLUID COOLED MOTORS
Filed Jan. 27, 1959 7 Sheets-Sheet 1

INVENTOR:
PHILIP RICHARD MOSSAY

Nov. 14, 1961 P. R. MOSSAY 3,009,072
FLUID COOLED MOTORS
Filed Jan. 27, 1959 7 Sheets-Sheet 2

INVENTOR:
PHILIP RICHARD MOSSAY
BY

Nov. 14, 1961  P. R. MOSSAY  3,009,072
FLUID COOLED MOTORS

Filed Jan. 27, 1959  7 Sheets-Sheet 5

INVENTOR:
PHILIP RICHARD MOSSAY
BY hem M. Strauss, AGT.

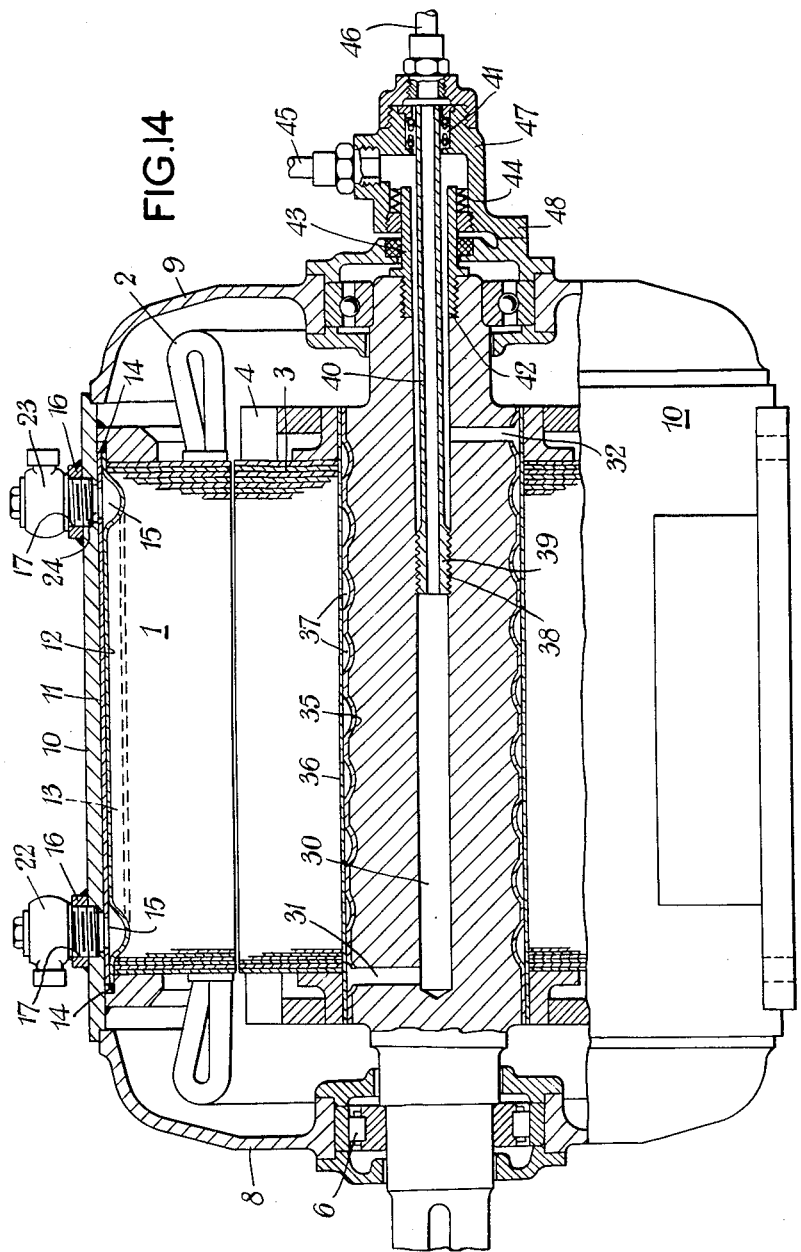

3,009,072
FLUID COOLED MOTORS
Philip Richard Mossay, Manchester, England, assignor to Laurence Scott & Electromotors Limited, Manchester, England
Filed Jan. 27, 1959, Ser. No. 789,372
Claims priority, application Great Britain Jan. 28, 1958
20 Claims. (Cl. 310—57)

The invention relates to fluid cooled motors.

Objects of the invention are to provide an electric motor with an efficient fluid cooling jacket in minimum overall dimensions, and to ensure a very intimate contact between the fluid jacket and the electrical iron of the motor, e.g. the stator pack and/or rotor pack, to enable the cooling jacket to embrace completely the surface to be cooled, to enable the water jacket to be made of non-corrosive metal or other material for example polythene where in fluid contact, and to facilitate replacement of the water jacket, if desired.

A method of manufacturing an electric motor with a cooling system according to the invention includes the steps or operations of providing channels in the stator or in the motor shaft adjacent the rotor, or the rotor, or in the barrel, or any combination thereof and lining them, including the channels, with a thin material by inserting a sandwich, composed of two concentric layers, of thin material between the stator or rotor iron, an outer support to the sandwich and in introducing pressure fluid between the two layers whereby they will both conform to the surfaces restricting their freedom of movement under the action of the pressure fluid.

According to the present invention an electric motor is provided with a cooling system comprising a sandwich inflated so that the two layers of the sandwich will conform intimately to the bounding surfaces of the sandwich, at least one of which surfaces is provided with channels whereby the adjacent layer of the sandwich, following the contour of the surface will provide passageways for the passage of cooling fluid.

Holes are provided in the carcase or barrel and in the outer layer of the sandwich for the introduction of pressure fluid during the hydraulic operation the "blown-up" sandwich remaining in its forming die, and suitable fittings are inserted in the holes to permit of this operation, and also interchange for other fittings for enabling inlet and outlet pipe connections to be made subsequently for the inflow and outflow of cooling fluid.

The invention includes a motor provided with a fluid cooling jacket made according to the method.

The term "thin" as herein used means a layer, for example of 0.020 inch.

In the accompanying drawings which show examples of fluid cooled motors according to the present invention:

FIGURES 4 and 5 are respectively side and front sectional elevational views of a sandwich prior to inflation, FIGURE 5 being taken on the plane of line V—V in FIGURE 4;

FIGURE 14 is a side sectional elevational view of a motor, partly in section, showing means for cooling the rotor, the channels being helically formed.

Figure 1:
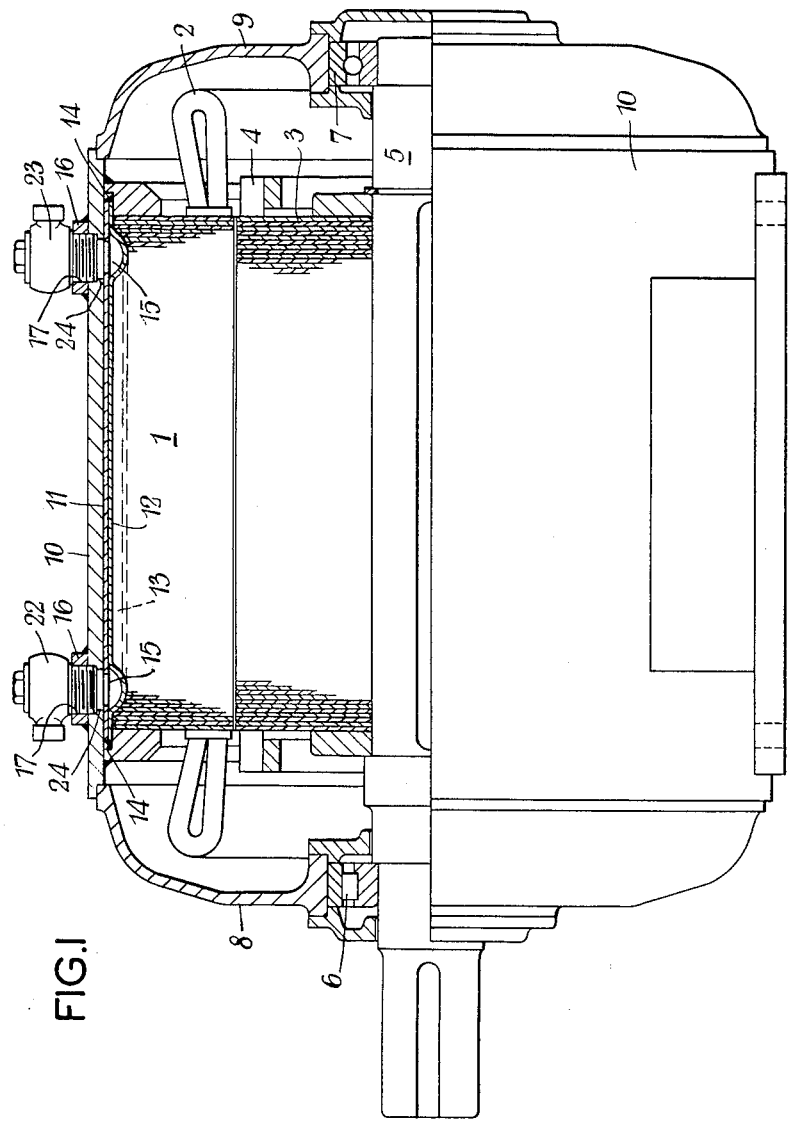
FIGURE 1 is a side sectional elevational view of a motor, half of which is in section.

Referring to FIGURE 1 of the drawings, an electric motor comprises a stator pack 1 of iron discs or laminae and the usual stator windings, 2, surrounding a rotor pack of iron discs or laminae 3 provided with rotor windings 4, the rotor pack being keyed to a shaft 5 carried in bearings 6, 7 in the frame of the motor. The frame comprises end plates 8, 9 and a stator pack surrounding barrel or shell 10.

In order to effect cooling of the stator pack an inflatable sandwich is inserted between the barrel and the stator pack and is inflated so that the sandwich conforms very closely to channels formed in the inner surface of the barrel or the outer surface of the stator pack, or the channels may be formed in both barrel and stator pack.

Figure 5:
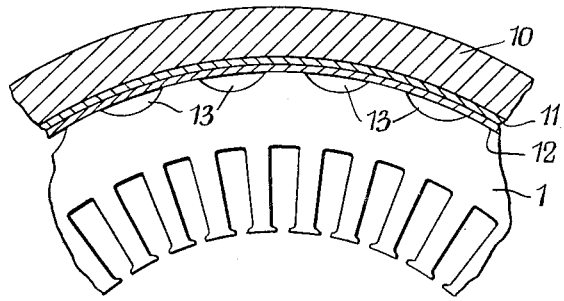
Figure 6:
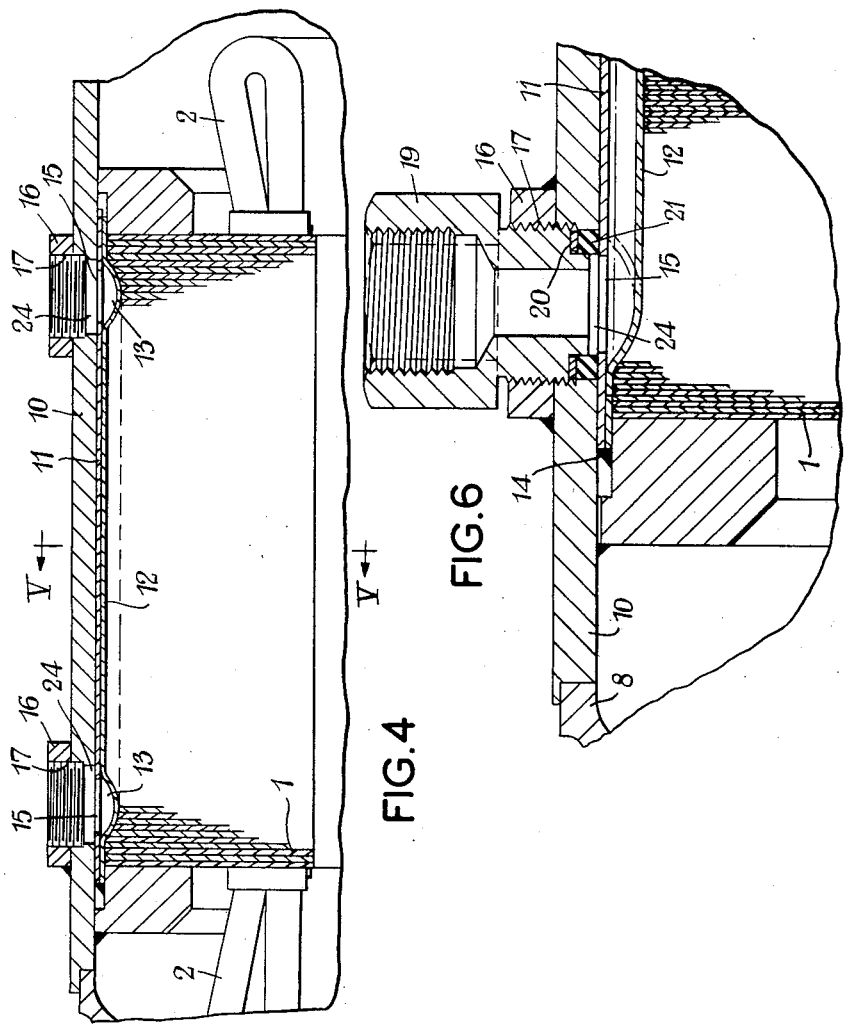
FIGURE 6 is a side sectional elevational view of the arrangement of the adaptor on the stator frame for the introduction of hydraulic pressure, the sandwich being shown inflated.

An example of the series of operations involved is shown in FIGURES 4, 5 and 6. Referring to these figures a sandwich composed of two layers of material 11, 12 is positioned between the barrel 10 and stator pack 1. The material used is, for example, stainless steel, or polythene.

A series of communicating channels 13 are machined out of the assembled stator pack, or punched out of the individual stator discs before assembly.

The sides and ends of the two layers are sealed together, as by welding 14.

Conveniently the sandwich consists of two layers of thin sheet metal, preferably non-corrosive metal, about 0.020 inch thick. Sheet polythene or like synthetic plastic may be used.

The stator pack 1 with the surrounding sandwich is pressed into the motor barrel 10 which is conveniently a cylinder completely surrounding the stator pack.

The barrel 10 and the outer layer 11 of the sandwich are previously drilled with holes respectively 24, 15 so that the holes in the barrel 10 will correspond with those in the outer layer of the sandwich when pressed into position.

A reinforcing ring 16, FIGURES 4 and 6, is welded to the barrel around each hole 24. Both rings are screw threaded at 17, one ring receiving a fitting, such as an adaptor 19 for connection to a hydraulic supply pipe, not shown, and the other ring receives a stopper or plug not shown during the hydraulic operation of inflating the sandwich. The adaptor 19 has sealing rings 20, 21.

The reinforcing rings 16 are subsequently used to receive fittings 22, 23 for supply and outflow pipes not shown for cooling fluid.

Figure 2:
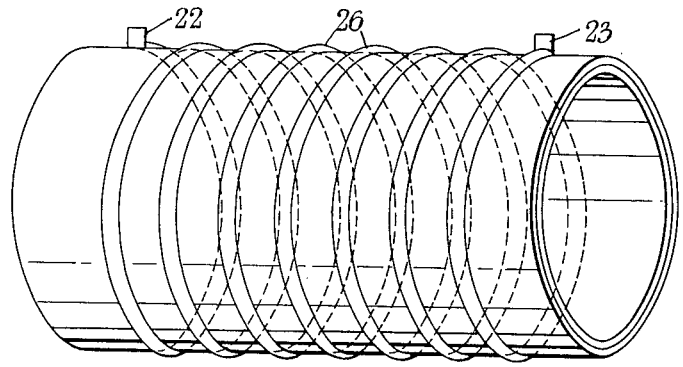
FIGURES 2 and 3 are perspective views of water jackets showing respectively the channels formed helically and in zig-zag formation.
Figure 3:
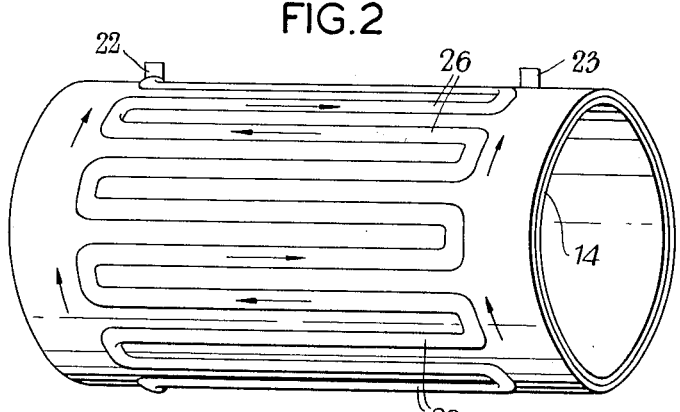

The fluid channels 26 formed by the inflation of the sandwich may zig-zag or meander axially around the stator pack, as shown diagrammatically in FIGURE 3, or may be wound helically around the stator pack as shown diagrammatically in FIGURE 2.

Figure 7:
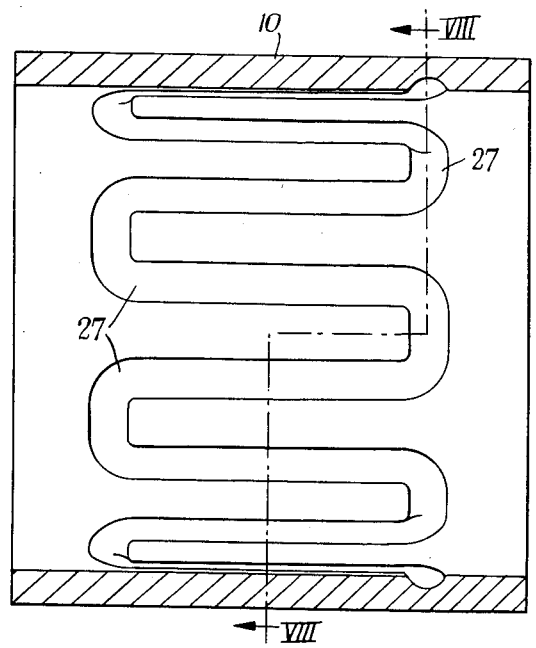
FIGURES 7 and 8 are respectively side and front sectional elevational views of a motor frame barrel showing the channels formed therein, FIGURE 8 being taken on the plane of line VIII—VIII in FIGURE 7.
Figure 8:
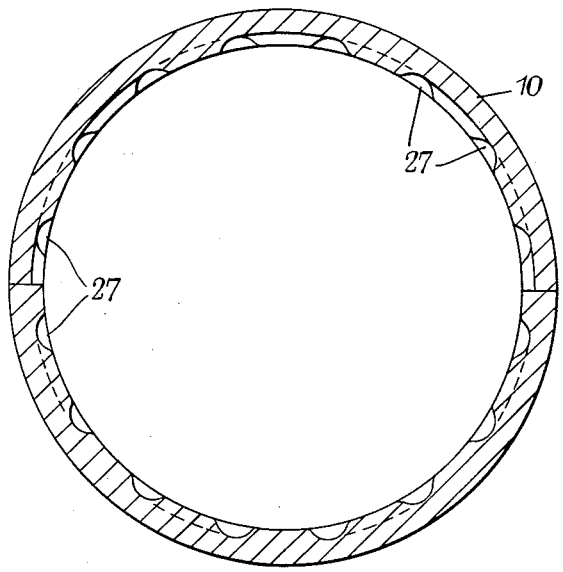
Figure 11:
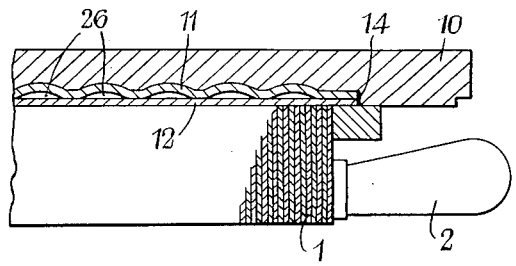
FIGURES 11, 12 and 13 are respectively a scrap side sectional elevational view of helical cooling channels, formed in the motor barrel, a front sectional elevational view of part of a zig-zag configuration of channel path formed in the stator, and a front sectional elevational view of part of a zig-zag configuration of channel path formed in the motor barrel.
Figure 12:
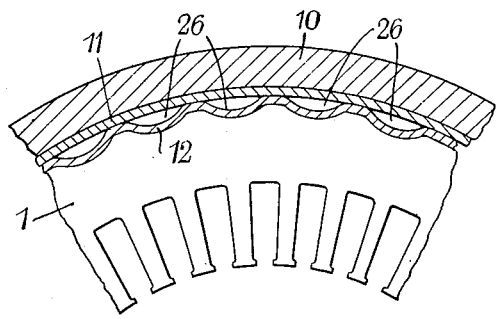
Figure 13:
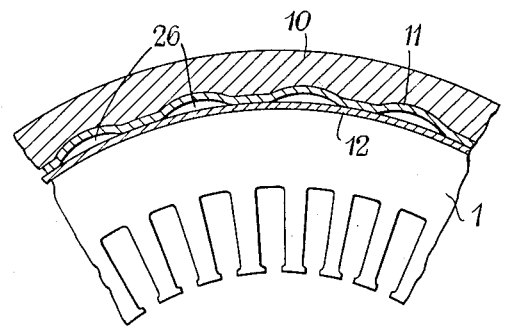

The position of the fluid channels may be varied, as shown in FIGURES 7 to 13. In FIGURES 7 and 8 channels 27 are machined in the inner surface of the barrel 10. The channels being in zig-zag configuration. The holes 24 have not yet been drilled in the barrel. FIGURE 13 shows the complete inflated sandwich with the outer layer 11 of the sandwich conforming to the channels 27, forming thereby coolant channels 26.

An example of helically wound channelling in the barrel is shown in FIGURE 11.

Figure 9:
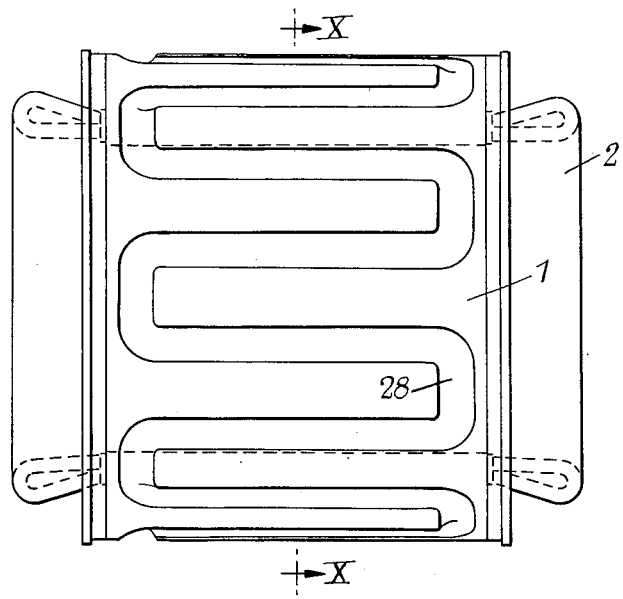
FIGURES 9 and 10 are respectively side elevational and front sectional elevational views of a stator showing the channels formed therein, FIGURE 10 being taken on the plane of line X—X in FIGURE 9.
Figure 10:
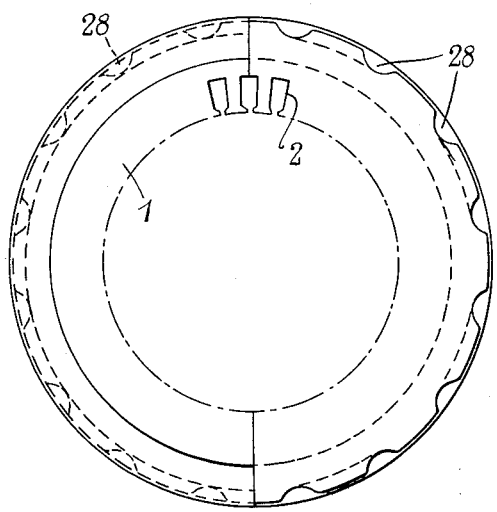

FIGURES 9 and 10 show a zig-zag configuration channel 28 machined in the surface of the stator pack 1. FIGURE 12 shows the resultant inflated sandwich in which the inner layer of the sandwich 12 has conformed to the shape of channels 28 forming thereby coolant channels 26.

If desired channels may be machined in both barrel and stator pack so that both inner and outer layers of the sandwich form coolant channels, which would be of substantially circular cross section.

An example of a means for cooling the rotor pack is shown in FIGURE 14. The stator may also be cooled as shown in FIGURE 14, either by providing zig-zag, meander or helical coolant channels in the stator pack or the barrel or both.

The shaft 5 of the motor is provided with a bore 30 having radial passages 31, 32.

The passages 31, 32 terminate in holes through the inner layer 35 of a sandwich having an outer layer 36 adjacent the inner axial surface of the rotor pack. The shaft 5 of the motor is machined to provide a helical groove into which the inner layer 35 conforms when the sandwich is inflated. Inflation is effected by the application of hydraulic pressure to the sandwich when the rotor pack has been secured to the shaft 5 of the motor.

During inflation the coolant channels 37 are formed.

Zig-zag pattern channels may be formed instead of the helical channels shown.

The bore 30 is interiorally threaded at 38 to receive a hollow plug 39 attached to a pipe 40 which extends axially and concentrically of the bore, to be carried at its outer end in fluid tight bearings 41.

The bore 30 is screw threaded at its rear end 42 to receive a hollow boss 43 which is free to rotate, with the shaft 5, in fluid tight bearings 44.

Unions 45, 46 are provided for the supply of coolant to the rotor. The bearings 41, 44 are carried in a housing 47 mounted by a bracket 48 on the end plate 9 of the motor body.

Coolant passes through the union 46, along the pipe 40, into the bore 30 along the passage 31 and through the channels 37 to the passage 32 to return along the bore and exhaust, through the union 45, into an exhaust pipe not shown.

Although the coolant channels in the foregoing examples are preferably of meander, zig-zag or helical form they may be of any other shape adapted to receive the sheet metal and to act for the flow of cooling fluid.

A cooling jacket, as above described in the several examples, can extend right round the motor and can be produced with a minimum diameter. Owing to the very intimate contact between the thin lining and the barrel and stator, good heat conductivity is ensured. By the use of non-corrosive sheet metal such as stainless steel or by the use of synthetic plastics, obstruction by corrosion in the passages is avoided.

A fluid jacket can be readily replaced by pressing out the pack and putting a new sandwich in its place and inflating it.

The principal parts of the electric motor as specified in the claims are the barrel of the motor, the stator pack, the rotor pack and the motor shaft.

What I claim is:

1. In an electric motor, a motor barrel, a stator pack within the barrel, and an insert between the pack and the barrel, the insert comprising inner and outer walls conforming intimately respectively to the outer surface of the stator pack and to the inner surface of the barrel, the inner surface of the barrel being formed with channels into which the outer wall of the insert fits, and the inner and outer walls of the insert defining therebetween passage ways for cooling fluid.

2. In an electric motor having an insert as specified in claim 1, said channels in the barrel are provided with an inlet and with an outlet spaced axially of the barrel from the inlet, and the channels follow a meandering path between the inlet and outlet.

3. In an electric motor having an insert as specified in claim 1, said channels in the barrel are provided with an inlet and with an outlet spaced axially of the barrel from the inlet, and the channels follow a helical path between the inlet and outlet.

4. In an electric motor having an insert as specified in claim 1, at axially end parts of the insert the outer and inner walls of the insert are bonded together.

5. In an electric motor, a motor barrel, a stator pack within the barrel, and an insert between the pack and the barrel, the insert comprising inner and outer walls conforming intimately respectively to the outer surface of the stator pack and to the inner surface of the barrel, the outer surface of the stator pack being formed with channels into which the inner wall of the insert fits, and the inner and outer walls of the insert defining therebetween passage ways for cooling fluid.

6. In an electric motor having an insert as specified in claim 5, said channels in the stator pack are provided with an inlet and with an outlet spaced axially of the stator pack from the inlet, and the channels follow a meandering path between the inlet and the outlet.

7. In an electric motor having an insert as specified claim 5, said channels in the stator pack are provided with an inlet and with an outlet spaced axially of the stator pack from the inlet, and the channels follow a helical path between the inlet and the outlet.

8. In an electric motor having an insert as specified in claim 5, at axially end parts of the insert the outer and inner walls are bonded together.

9. In an electric motor, a motor barrel, a stator pack within the barrel, and an insert between the pack and the barrel, the insert comprising inner and outer walls conforming intimately respectively to the outer surface of the stator pack and to the inner surface of the barrel, the inner surface of the barrel being formed with channels into which the outer wall of the insert fits, the outer surface of the stator pack being formed with channels into which the inner wall of the insert fits, and the inner and outer walls of the insert defining therebetween passage ways for cooling fluid.

10. In an electric motor, a motor shaft, a rotor pack mounted on the motor shaft, and an insert between the rotor pack and the shaft, the insert comprising inner and outer walls conforming intimately respectively to the outer surface of the shaft and to the inner surface of the rotor pack, the inner surface of the rotor pack being formed with channels into which the outer wall of the insert fits, and the inner and outer walls of the insert defining therebetween passage ways for cooling fluid.

11. In an electric motor having an insert as specified in claim 10, said channels in the rotor pack are provided with an inlet and with an outlet spaced axially of the rotor pack from the inlet, and the channels follow a meandering path between the inlet and the outlet.

12. In an electric motor having an insert as specified in claim 10, said channels in the rotor pack are provided with an inlet and with an outlet spaced axially of the rotor pack from the inlet, and the channels follow a helical path between the inlet and the outlet.

13. In an electric motor having an insert as specified in claim 10, at axially end parts of the insert the outer and inner walls of the insert are bonded together.

14. An electric motor having an insert as specified in claim 10, in which the insert is provided with an inlet to the passage ways and with an outlet from the passage ways spaced axially of the shaft from the inlet to the passage ways, the motor shaft includes an axially extending passage way, and two laterally extending passage ways in the shaft communicate respectively two axially spaced zones of the passage way in the shaft with the inlet and the outlet of the insert.

15. In an electric motor, a motor barrel, a stator pack within the barrel, a motor shaft, a rotor pack mounted on the motor shaft, and an insert between adjacent surfaces of one of the packs and the motor barrel or shaft to which that pack is fixed, the insert comprising inner and outer walls conforming intimately to the two adjacent surfaces, one of which is formed with channels into which the adjacent wall of the insert fits, and the inner and outer walls of the insert defining therebetween passage ways for cooling fluid.

16. In an electric motor, a cooling system comprising a sandwich, bounding surfaces, said sandwich including two layers conforming intimately to said bounding surfaces, channels being formed in at least one of said bounding surfaces, the adjacent of said two layers to that surface following the contours of said channels to form passage ways for cooling fluid, and a motor barrel, said channels in one of said bounding surfaces being formed in the interior of said motor barrel.

17. In an electric motor, a cooling system comprising a sandwich, bounding surfaces, said sandwich including two layers conforming intimately to said bounding surfaces, channels being formed in at least one of said bounding surfaces, the adjacent of said two layers to that surface following the contours of said channels to form passage ways for cooling fluid, and having a stator pack, said channels in one of said bounding surfaces being formed in the outer surface of said stator pack.

18. In an electric motor, a cooling system comprising a sandwich, bounding surfaces, said sandwich including two layers conforming intimately to said bounding surfaces, the adjacent of said two layers to that surface following the contours of said channel to form passage ways for cooling fluid, and having a motor shaft, and a rotor pack adjacent said motor shaft, said channels in one of said bounding surfaces being formed in an inner axial surface of said rotor pack adjacent the motor shaft.

19. In an electric motor, a cooling system comprising a sandwich, bounding surfaces, said sandwich including two layers conforming intimately to said bounding surfaces, channels being formed in at least one of said bounding surfaces, the adjacent of said two layers to that surface following the contours of said channels to form passage ways for cooling fluid, and having a motor barrel and a stator pack, said channels in said bounding surfaces being formed in the interior of said motor barrel and the outer surface of said stator pack.

20. In an electric motor, a cooling system comprising a sandwich, bounding surfaces, said sandwich including two layers conforming intimately to said bounding surfaces, channels being formed in at least one of said bounding surfaces, the adjacent of said two layers to that surface following the contours of said channels to form passage ways for cooling fluid, and having a motor shaft, a rotor for said electric motor mounted on said motor shaft, said motor shaft having an axial bore therein, said channels being formed in the inner axial surface of said rotor pack, said motor shaft having radial openings communicating between said bore and said passage ways for cooling fluid.

References Cited in the file of this patent

UNITED STATES PATENTS

| 1,601,531 | Jeannin | Sept. 28, 1926 |
| 1,709,865 | Muffly | Apr. 23, 1929 |
| 2,062,470 | Mossay | Dec. 1, 1936 |
| 2,414,532 | Johns et al. | Jan. 21, 1947 |
| 2,759,247 | Grenell | Aug. 21, 1956 |

FOREIGN PATENTS

| 935,442 | Germany | Nov. 17, 1955 |